US012114206B2

(12) United States Patent
Harada et al.

(10) Patent No.: US 12,114,206 B2
(45) Date of Patent: Oct. 8, 2024

(54) TERMINAL AND WIRELESS COMMUNICATION METHOD FOR CONTROLLING UPLINK

(71) Applicant: NTT DOCOMO, INC., Tokyo (JP)

(72) Inventors: Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 358 days.

(21) Appl. No.: 17/442,383

(22) PCT Filed: Mar. 27, 2019

(86) PCT No.: PCT/JP2019/013068
§ 371 (c)(1),
(2) Date: Sep. 23, 2021

(87) PCT Pub. No.: WO2020/194562
PCT Pub. Date: Oct. 1, 2020

(65) Prior Publication Data
US 2022/0174537 A1   Jun. 2, 2022

(51) Int. Cl.
*H04W 28/06*   (2009.01)
(52) U.S. Cl.
CPC ................................ *H04W 28/06* (2013.01)
(58) Field of Classification Search
None
See application file for complete search history.

(56) References Cited

U.S. PATENT DOCUMENTS

| 2013/0046821 A1* | 2/2013 | Alanara | H04W 52/0216 |
| | | | 709/204 |
| 2019/0191424 A1* | 6/2019 | Wang | H04W 72/046 |
| 2020/0267025 A1* | 8/2020 | Yu | H04L 5/0051 |
| 2021/0167930 A1* | 6/2021 | Jeon | H04L 27/2607 |

FOREIGN PATENT DOCUMENTS

| JP | 2017-508418 A | 3/2017 |
| JP | 2017-175348 A | 9/2017 |

OTHER PUBLICATIONS

International Search Report issued in PCT/JP2019/013068 on Jun. 25, 2019 (5 pages).
Written Opinion of the International Searching Authority issued in PCT/JP2019/013068 on Jun. 25, 2019 (3 pages).
3GPP TS 38.212 V15.4.0; "3rd Generation Partnership Project; Technical Specification Group Radio Access Network; NR; Multiplexing and channel coding (Release 15)"; Dec. 2018 (100 pages).

* cited by examiner

*Primary Examiner* — Christine T Duong
(74) *Attorney, Agent, or Firm* — Osha Bergman Watanabe & Burton LLP

(57) ABSTRACT

This terminal is provided with: a reception unit for receiving control information concerning uplink transmission, which is common to a terminal group; and a control unit for controlling at least one of the uplink transmission and reception from another terminal which performs the uplink transmission, on the basis of the control information.

4 Claims, 10 Drawing Sheets

TERMINAL AND WIRELESS COMMUNICATION METHOD FOR CONTROLLING UPLINK

TECHNICAL FIELD

The present disclosure relates to a terminal and a radio communication method.

BACKGROUND ART

Long Term Evolution (LTE) has been specified for achieving a higher data rate, lower latency, and the like in a Universal Mobile Telecommunication System (UMTS) network. Future systems of LTE have also been studied for achieving a broader bandwidth and a higher speed based on LTE. Examples of future systems of LTE include the systems called LTE-Advanced (LTE-A), Future Radio Access (FRA), 5th generation mobile communication system (5G), 5G plus (5G+), New Radio Access Technology (New-RAT), New Radio (NR), and the like.

In addition, future systems of 5G have also been studied. Examples of future systems of 5G include, for example, a system referred to as Beyond 5G.

CITATION LIST

Non-Patent Literature

NPL 1
3GPP TS 38.212 V15.4.0 "3rd Generation Partnership Project; Technical Specification Group Radio Access Network; NR; Multiplexing and channel coding (Release 15)", December 2018

SUMMARY OF INVENTION

Technical Problem

Future systems of 5G requires to increase the speed of communication throughput.

One object of the present disclosure is to facilitate providing a technology for increasing the speed of communication throughput.

Solution to Problem

A terminal according to one aspect of the present disclosure includes: a reception section that receives control information related to uplink transmission, the control information being common to a terminal group; and a control section that controls, based on the control information, at least one of the uplink transmission and reception from another terminal performing the uplink transmission.

Advantageous Effects of Invention

According to the present disclosure, it is possible to achieve an increase in speed of communication throughput.

DESCRIPTION OF EMBODIMENTS

Hereinafter, an embodiment of the present disclosure will be described with reference to the accompanying drawings.

Embodiment

Figure 1:
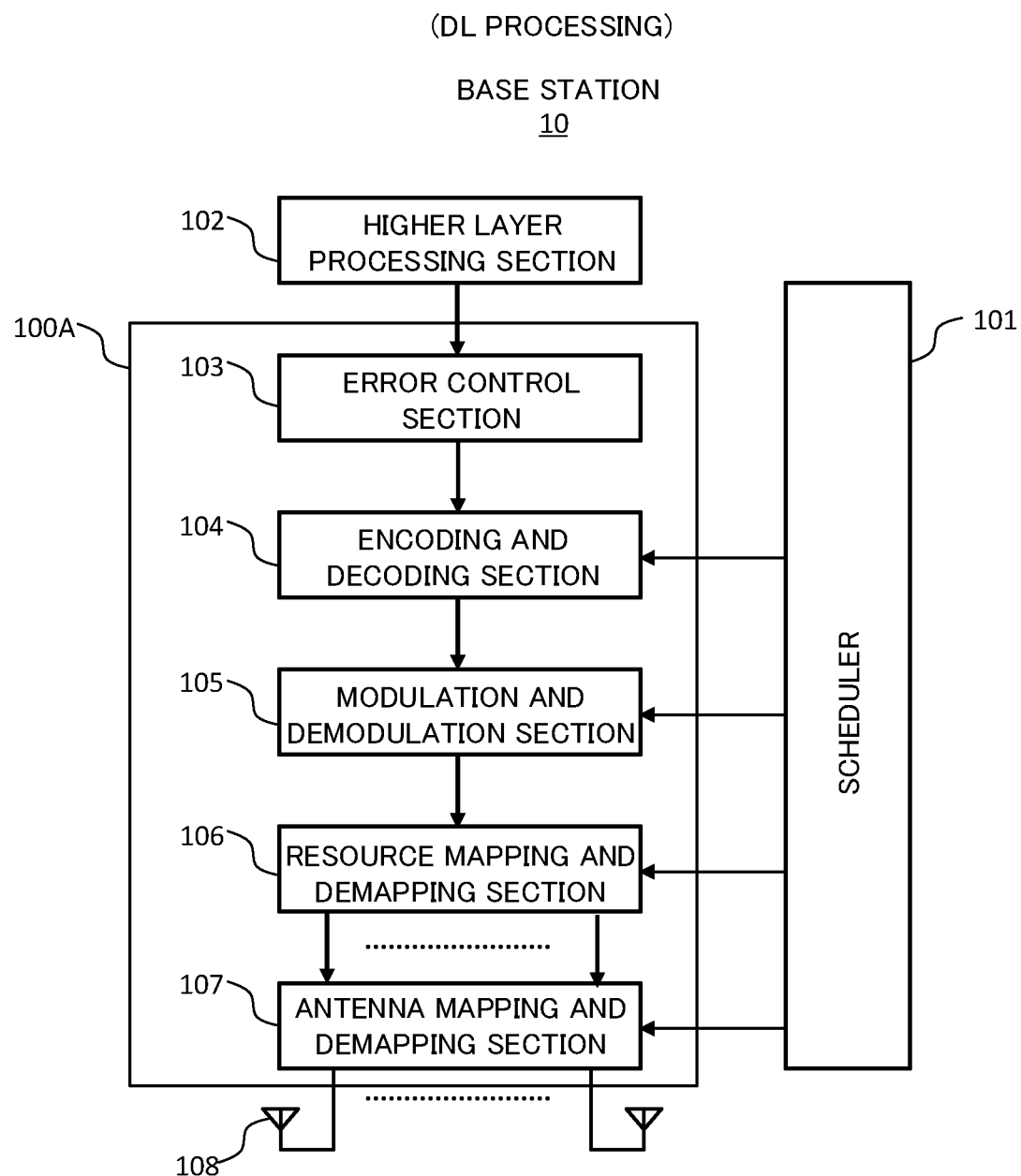
FIG. 1 illustrates examples of a configuration and DownLink (DL) transmission processing of a base station according to an embodiment.
Figure 2:
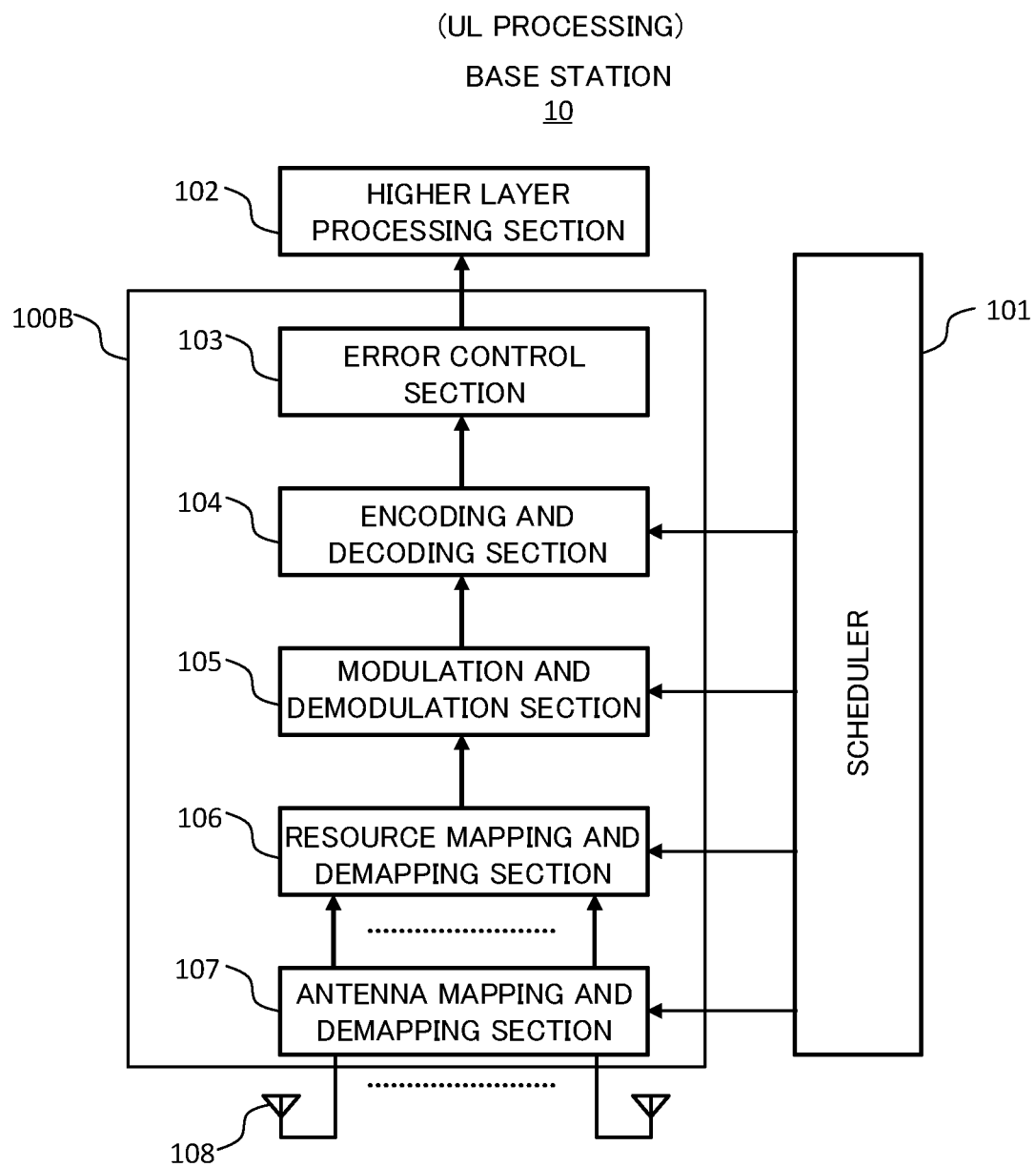
FIG. 2 illustrates examples of a configuration and UpLink (UL) reception processing of the base station according to the embodiment.
Figure 3:
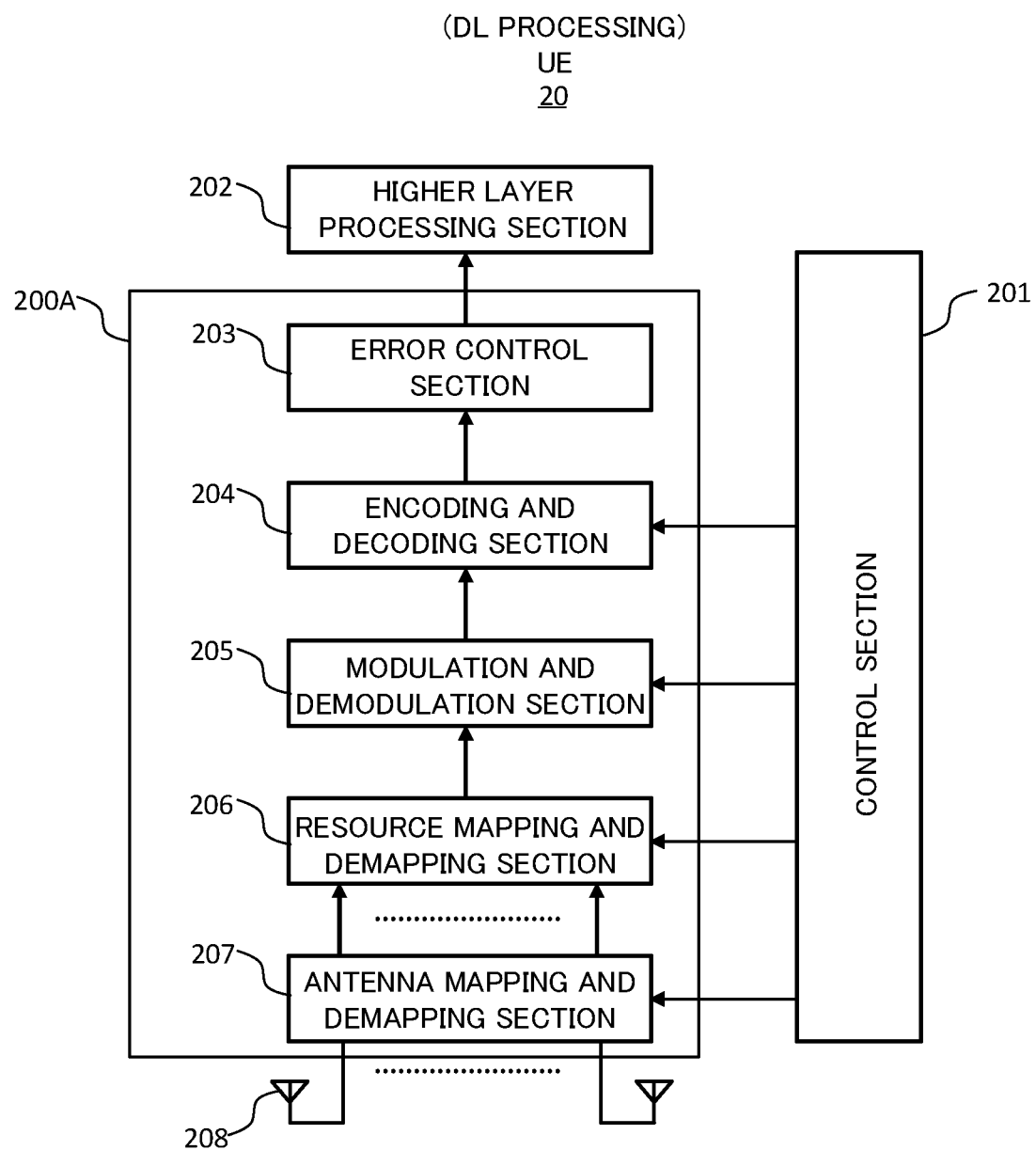
FIG. 3 illustrates examples of a configuration and DownLink (DL) reception processing of User Equipment (UE) according to the embodiment.
Figure 4:
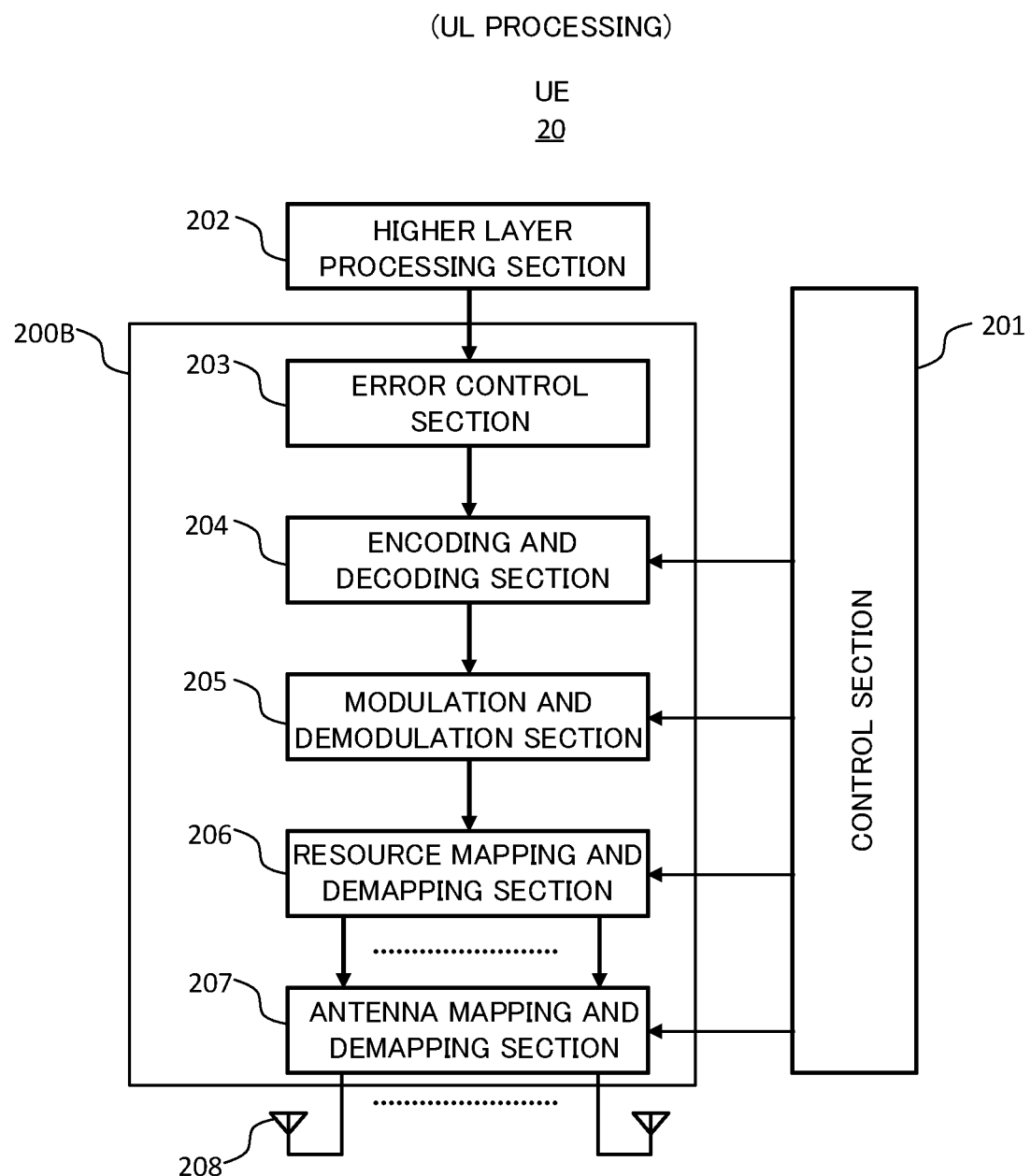
FIG. 4 illustrates examples of a configuration and UpLink (UL) transmission processing of the UE according to the embodiment.

A radio communication system according to the embodiment includes, for example, base station 10 illustrated in FIGS. 1 and 2 and UE 20 illustrated in FIGS. 3 and 4. UE 20 may be replaced with other terms such as a user terminal, a communication device, and a communication device. UE 20 connects to (accesses) base station 10.

<Base Station>

FIG. 1 illustrates examples of a configuration and DownLink (DL) transmission processing of base station 10 according to an embodiment. With reference to FIG. 1, the DL transmission processing in which base station 10 transmits a signal to UE 20 will be described.

As illustrated in FIG. 1, base station 10 includes scheduler 101, higher layer processing section 102, error control section 103, encoding and decoding section 104, modulation and demodulation section 105, resource mapping and demapping section 106, antenna mapping and demapping section 107, and one or more antennae 108. Note that, error control section 103, encoding and decoding section 104, modulation and demodulation section 105, resource mapping and demapping section 106, and antenna mapping and demapping section 107 are examples of transmission section 100A that performs the DL transmission processing.

Higher layer processing section 102 processes, for example, signals in layer 2 and layer 3 positioned above a physical layer (layer 1). The processing in layer 2 includes, for example, Medium Access Control (MAC) processing and Radio Link Control (RLC) processing. The processing in layer 3 includes, for example, Radio Resource Control (RRC) processing. The RRC processing includes, for example, generation of RRC signaling which is an exemplary higher layer signal. Higher layer processing section 102 outputs a generated signal to error control section 103.

Error control section 103 adds a signal for error detection such as Cyclic Redundancy Check (CRC) to the signal output from higher layer processing section 102 and outputs a resultant signal to encoding and decoding section 104.

Encoding and decoding section 104 encodes the signal output from error control section 103 based on a setting from scheduler 101 and outputs an encoded signal to modulation and demodulation section 105.

Modulation and demodulation section 105 modulates the signal output from encoding and decoding section 104 based on the setting from scheduler 101 and outputs a modulated signal to resource mapping and demapping section 106.

Resource mapping and demapping section 106 maps the transmission signal output from modulation and demodulation section 105 to a radio resource based on the setting from scheduler 101 (e.g., resource allocation information). Resource mapping and demapping section 106 also maps a control signal, reference signal, and the like, to the radio resource based on the setting from scheduler 101. Note that, the control signal may include control information (e.g., Downlink Control Information (DCI)). The DCI may include Modulation and Coding Scheme (MCS) information. Resource mapping and demapping section 106 then outputs a signal and the like mapped to the radio resource to antenna mapping and demapping section 107.

Antenna mapping and demapping section 107 maps the signal output from resource mapping and demapping section 106 to each antenna 108 based on the setting from scheduler 101 (e.g., antenna allocation information). Antenna mapping and demapping section 107 then outputs a mapped signal to antenna 108 which is a mapping designation.

Antenna 108 outputs (i.e., transmits) the signal output from antenna mapping and demapping section 107 into space.

Scheduler 101 sets a coding rate, modulation scheme, and the like to encoding and decoding section 104 and modulation and demodulation section 105 based on a channel quality (e.g., Channel State Information (CSI)) between base station 10 and UE 20. In addition, scheduler 101 determines a radio resource to which the transmission signal and the like are assigned, and sets resource allocation information, which is a determination result, to resource mapping and demapping section 106. Moreover, scheduler 101 determines which antenna 108 transmits each signal mapped to the corresponding radio resource, and sets antenna allocation information, which is a determination result, to antenna mapping and demapping section 107. Besides, scheduler 101 may make a setting for performing beamforming by using a plurality of antennae 108.

FIG. 2 illustrates examples of a configuration and UpLink (UL) reception processing of base station 10 according to the embodiment. With reference to FIG. 2, the UL reception processing in which base station 10 receives a signal from UE 20 will be described. Note that, error control section 103, encoding and decoding section 104, modulation and demodulation section 105, resource mapping and demapping section 106, and antenna mapping and demapping section 107 are examples of reception section 100B that performs the UL reception processing.

Each antenna 108 receives the signal transmitted from UE 20 and outputs the transmitted signal to antenna mapping and demapping section 107.

Antenna mapping and demapping section 107 demaps the signal output from each antenna 108 based on the setting from scheduler 101 (e.g., antenna allocation information) and outputs a resultant signal to resource mapping and demapping section 106.

Resource mapping and demapping section 106 extracts (i.e., demaps) the signal from the radio resource based on the setting from scheduler 101 (e.g., resource allocation information) and outputs an extracted signal to modulation and demodulation section 105.

Modulation and demodulation section 105 demodulates the signal output from resource mapping and demapping section 106 based on the setting from scheduler 101 and outputs a demodulated signal to encoding and decoding section 104.

Encoding and decoding section 104 decodes the signal output from modulation and demodulation section 105 based on the setting from scheduler 101 and outputs a decoded signal to error control section 103.

Error control section 103 performs the error detection with respect to the signal output from encoding and decoding section 104 and outputs a signal obtained by removing the signal for the error detection to higher layer processing section 102. Incidentally, when detecting an error, error control section 103 may notify higher layer processing section 102 of information indicating the detection of the error.

Higher layer processing section 102 receives the signal output from error control section 103 and performs the processing in layer 2 and layer 3. The processing in layer 2 includes, for example, the MAC processing and the RLC processing. The processing in layer 3 includes, for example, the RRC processing. The RRC processing includes, for example, an extraction of RRC signaling which is an exemplary higher layer signal.

<UE>

FIG. 3 illustrates examples of a configuration and Down-Link (DL) reception processing of a UE according to the embodiment. With reference to FIG. 3, the DL reception processing in which UE 20 receives a signal from base station 10 will be described.

As illustrated in FIG. 3, UE 20 includes control section 201, higher layer processing section 202, error control section 203, encoding and decoding section 204, modulation and demodulation section 205, resource mapping and demapping section 206, antenna mapping and demapping section 207, and one or more antennae 208. Note that, error control section 203, encoding and decoding section 204, modulation and demodulation section 205, resource mapping and demapping section 206, and antenna mapping and demapping section 207 are examples of reception section 200A that performs the DL reception processing.

Each antenna 208 receives the signal transmitted from base station 10 and outputs the transmitted signal to antenna mapping and demapping section 207.

Antenna mapping and demapping section 207 demaps the signal output from each antenna 208 based on a setting from control section 201 and outputs a resultant signal to resource mapping and demapping section 206.

Resource mapping and demapping section 206 extracts (i.e., demaps) the signal from the radio resource allocated to UE 20 based on the setting from control section 201 and outputs the extracted signal to modulation and demodulation section 205.

Modulation and demodulation section 205 demodulates the signal output from resource mapping and demapping section 206 based on the setting from control section 201 and outputs the demodulated signal to encoding and decoding section 204.

Encoding and decoding section 204 decodes the signal output from modulation and demodulation section 205 based on the setting from control section 201 and outputs the decoded signal to error control section 203.

Error control section 203 performs the error detection with respect to the signal output from encoding and decoding section 204 and outputs a signal obtained by removing the signal for the error detection to higher layer processing section 202. When detecting an error, error control section 203 may notify higher layer processing section 202 of information indicating the detection of the error.

Higher layer processing section 202 receives the signal output from error control section 203 and performs the processing in layer 2 and layer 3. The processing in layer 2 includes, for example, the MAC processing and the RLC processing. The processing in layer 3 includes, for example, the RRC processing. The RRC processing includes, for example, an extraction of RRC signaling which is an exemplary higher layer signal.

Control section 201 makes settings of encoding and decoding section 204 and modulation and demodulation section 205 based on control information received from base station 10. In addition, control section 201 makes a setting of resource mapping and demapping section 206 based on the control information received from base station 10. Moreover, control section 201 makes a setting of antenna mapping and demapping section 207. Besides, scheduler 201 may make a setting for performing beamforming by using a plurality of antennae 208.

FIG. 4 illustrates examples of a configuration and UpLink (UL) transmission processing of the UE according to the embodiment. With reference to FIG. 4, the UL transmission processing in which UE 20 transmits a signals to base station 10 will be described. Note that, error control section 203, encoding and decoding section 204, modulation and demodulation section 205, resource mapping and demapping section 206, and antenna mapping and demapping section 207 are examples of reception section 200B that performs the UL transmission processing.

Higher layer processing section 202 processes, for example, signals in layer 2 and layer 3. The processing in layer 2 includes, for example, the MAC processing and the RLC processing. The processing in layer 3 includes, for example, the RRC processing. The RRC processing includes, for example, a generation of RRC signaling which is an exemplary higher layer signal. Higher layer processing section 202 outputs the generated signal to error control section 203.

Error control section 203 adds a signal for the error detection such as the CRC to the signal output from higher layer processing section 202 and outputs a resultant signal to encoding and decoding section 204.

Encoding and decoding section 204 encodes the signal output from error control section 203 based on the setting from control section 201 and outputs an encoded signal to modulation and demodulation section 205.

Modulation and demodulation section 205 modulates the signal output from encoding and decoding section 204 based on the setting from control section 201 and outputs a modulated signal to resource mapping and demapping section 206.

Resource mapping and demapping section 206 maps the signal output from modulation and demodulation section 205 to a radio resource based on the setting from control section 201. Resource mapping and demapping section 206 also maps the control signal and reference signal to the radio resource based on the setting from control section 201. Resource mapping and demapping section 206 then outputs a signal mapped to the radio resource to antenna mapping and demapping section 207.

Antenna mapping and demapping section 207 maps the signal output from resource mapping and demapping section 206 to each antenna 208 based on the setting from control section 201. Antenna mapping and demapping section 207 then outputs a mapped signal to antenna 208 which is a mapping designation.

Antenna 208 outputs (i.e., transmits) the signal output from antenna mapping and demapping section 207 into space.

Base station 10 transmits the control signal to UE 20 by using a downlink control channel (e.g., Physical Downlink Control Channel (PDCCH)) and transmits a data signal and the reference signal by using a downlink data channel (e.g., downlink shared channel: Physical Downlink Shared Channel (PDSCH)).

UE 20 transmits the control signal to base station 10 by using an uplink control channel (e.g., Physical Uplink Control Channel (PUCCH)) and transmits the data signal and the reference signal by using an uplink data channel (e.g., an uplink shared channel: Physical Uplink Shared Channel (PUSCH)).

Note that, the downlink channels and uplink channels used by base station 10 and UE 20 for transmission and reception are not limited to the above-described PDCCH, PDSCH, PUCCH, PUSCH, or the like, and may be other channels such as Physical Broadcast Channel (PBCH) and Physical Random Access Channel (PRACH).

Besides, a signal waveform generated in base station 10 and UE 20 in FIGS. 1 to 4 may be a signal waveform based on an Orthogonal Frequency Division Multiplexing (OFDM) modulation. Alternatively, the signal waveform may be a signal waveform based on Single Carrier-Frequency Division Multiple Access (SC-FDMA) or DFT-Spread-OFDM (DFT-S-OFDM), or may be another signal waveform. Incidentally, in FIGS. 1 to 4, a description is omitted of a configuration section for generating the signal waveform (e.g., Inverse Fast Fourier Transform (IFFT) processing section, Cyclic Prefix (CP) adding section, CP removal section, and Fast Fourier Transform (FFT) processing section).

<Study>

For increasing the speed of Transmission Control Protocol (TCP) throughput of DL, an increase in speed of UL throughput is required for faster TCP-acknowledgement (ACK). For example, in order to achieve a communication rate of 10 Gbps in DL, a communication rate of around 500 Mbps is required in UL.

As methods for improving the UL throughput, application of Multiple-Input and Multiple-Output (MIMO), carrier aggregation, high-order modulation, and broadband transmission is considered. However, the application of MIMO for UL involves, for example, increases in cost, size, and power consumption of a terminal. Moreover, the application of carrier aggregation for UL involves, for example, increases in cost and size of the terminal. The application of carrier aggregation for UL also involves, for example, an increase in Peak-to-Average Power Ratio (PAPR) and an intermodulation distortion due to discontinuities in transmission bands. Furthermore, the application of higher order modulation and broadband transmission for UL involve a trade-off with the coverage due to a limitation of a total amount of transmission power.

Figure 5:
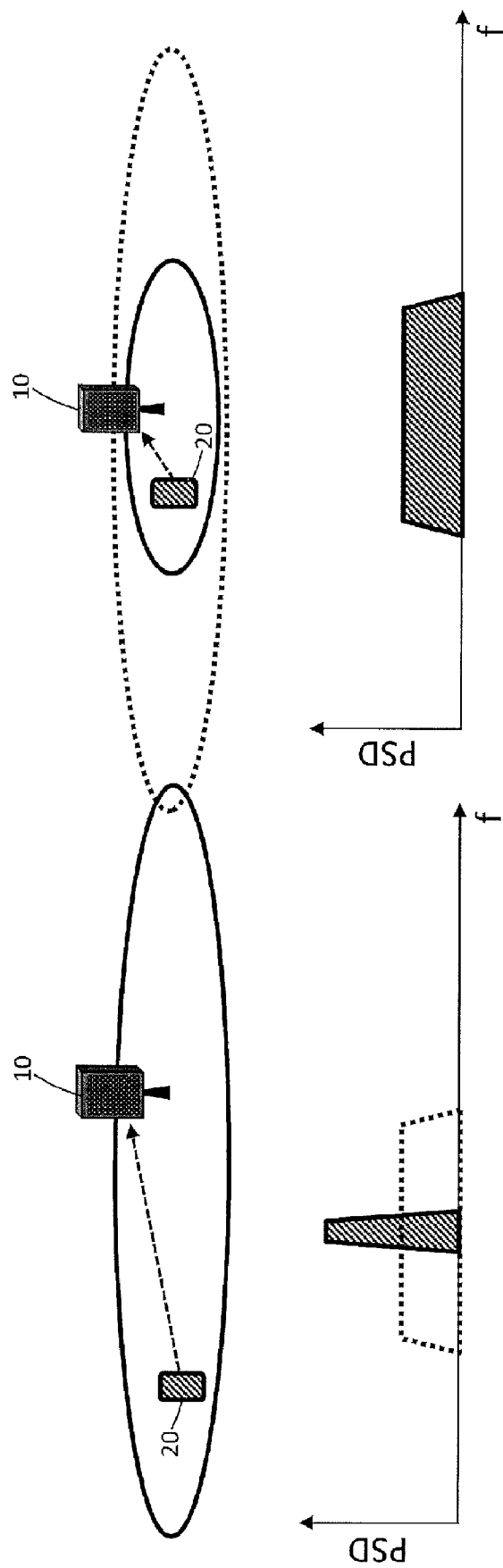
FIG. 5 is a diagram for describing a relationship between a transmission band, transmission power, and coverage of the UL.

For example, as illustrated on a left side of FIG. 5, increasing a Power Spectral Density (PSD) of transmission in a narrow band makes it possible to expand an UL communication distance (i.e., UL coverage), whereas, as illustrated on a right side of FIG. 5, decreasing the PSD of the transmission makes it possible to apply a broadband transmission to the UL communication. However, in the latter case, the UL coverage reduces.

Figure 6:
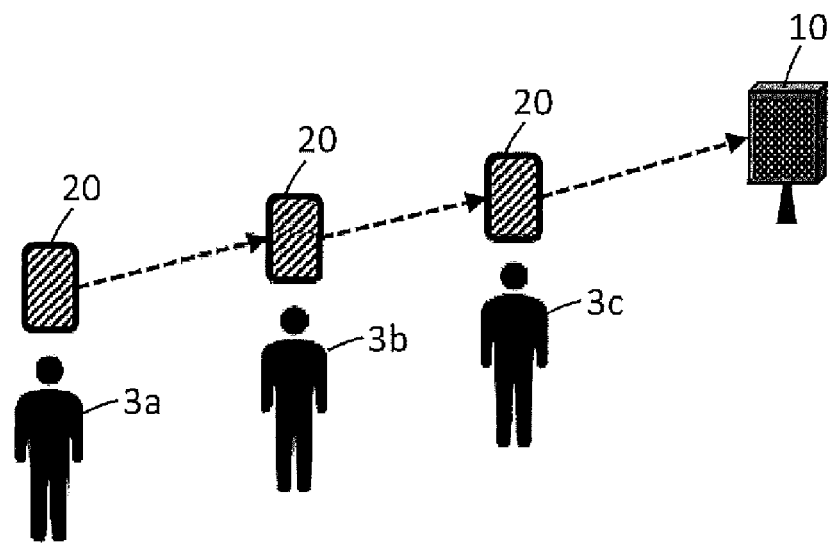
FIG. 6 is a diagram for describing an ad hoc relay by the UE.

An another method to improve the UL-throughput, as illustrated in FIG. 6, application of an ad hoc relay by a plurality of UEs 20 is considered. The application of the ad hoc relay possibly realizes a reduction of the communication distance of UL, improvement of utilization efficiency of high frequency bands, and an extension of the coverage. In the ad hoc relay, however, a battery of UE 20 used as a relay station is consumed. Thus, unless some incentives are given to users 3b and 3c of which UEs 20 are used as the relay stations, the users 3b and 3c are not motivated to use their own UEs 20 as the relay stations.

Figure 7:
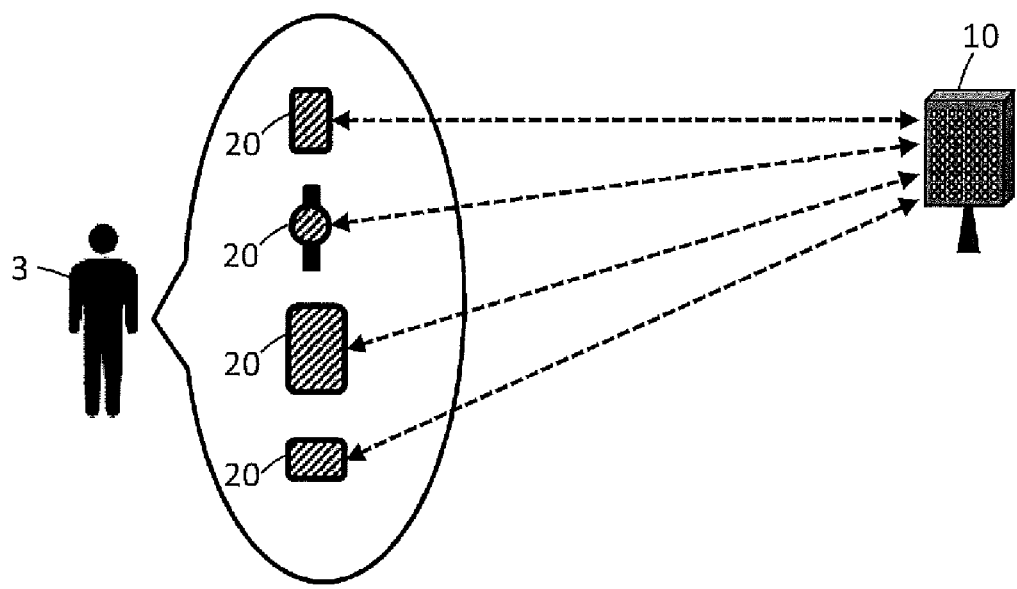
FIG. 7 illustrates an example in which a plurality of UEs carried by a user performs a radio communication with the base station.

Meanwhile, as illustrated in FIG. 7, same user 3 may carry more than one UE 20, such as a smartphone, smartwatch, tablet terminal, and mobile router. When same user 3 has a plurality of UEs 20, the existing Radio Access Network (RAN) controls communications of a plurality of UEs 20 individually. In the following, a description will be given of how to achieve an increase in speed of the UL throughput by cooperatively controlling the communications of a plurality of UEs 20 at a RAN level.

<Group-Common RNTI>

The radio communication system manages a plurality of UEs 20 carried by same user 3 as a group (e.g., a terminal group) in an RRC and/or MAC layer, for example.

In this case, base station 10 may notify UE 20, via RRC signaling, of a Radio Network Temporary Identifier (RNTI) (hereinafter referred to as "group-common RNTI"), which is an example of identification information used for scheduling a plurality of UEs 20 in the group at the same time. Note that, the expression "at the same time" can be replaced with terms such as "collectively," "simultaneously," or "together." Moreover, base station 10 may notify UE 20, via RRC signaling, of an intra-group ID for identifying each UE 20 in the group individually, in addition to the group-common RNTI. Alternatively, base station 10 may notify UE 20, via RRC signaling, of Cell (C)-to RNTI of one of UEs 20 in the group, in addition to the group-common RNTI.

In the present embodiment, one of UEs 20 in the group is expressed as, for convenience, a "representative UE." The term "representative UE" may be replaced with other terms such as a "selective UE" or an "aggregative UE". Moreover, in the group, there may be one or a plurality of representative UEs 20. Furthermore, representative UE 20 may be fixed or changed in the group.

Base station 10 may determine a plurality of UEs 20 to be managed as one group based on contract information of UE 20. For example, base station 10 may manage a plurality of UEs 20 contracted by same user 3 as one group.

Furthermore, a plurality of UEs 20 managed as one group is not always carried by the same user. For example, base station 10 may determine a plurality of UEs 20 to be managed as one group based on a setting related to cooperation in UE 20. In one example, different users (e.g., family or friends acting together) make settings for UEs 20 to permit a cooperative operation, respectively. In this case, each UE 20 transmits, to base station 10, information indicating that the setting for permitting the cooperative operation has been made. Base station 10 manages UEs 20 that have transmitted the information indicating that the setting for permitting the cooperative operation has been made as one group.

<Group-Common DCI>

Base station 10 may indicate UL transmission and/or SideLink (SL) transmission and SL reception at the same time to UEs 20 in the group by using DCI, which is an example of the control information common to a plurality of UEs 20 in the group (hereinafter referred to as "group-common DCI"). Note that, the UL transmission can be replaced with uplink transmission. In addition, the expression "at the same time" can be replaced with terms such as "collectively," "simultaneously," or "together." The group-common DCI may be CRC-scrambled by the group-common RNTI. Here, SL indicates a linkage between UEs 20. That is, the SL transmission and SL reception indicate the transmission and reception of signals between UEs 20.

In this case, the group-common DCI may include at least one of the following (A1) and (A2), in addition to information elements included in the DCI for UL scheduling such as DCI format 0_0 or 0_1.

(A1) The group-common DCI may include information indicating which UE 20 in the group performs the UL-transmission and/or SL-transmission. For example, the group-common DCI may have a field for notifying a value of the intra-group ID set in RRC signaling. In this case, UE 20 corresponding to the intra-group ID notified in the field may perform the UL transmission and/or SL transmission.

(A2) The group-common DCI may include resource information for the UL transmission of the signal received in SL by UE 20. In this case, for example, UE 20 may transmit the signal received in SL from representative UE 20 to base station 10 based on the resource information.

Alternatively, the group-common DCI may be interpreted implicitly such that representative UE 20 in the group performs the UL transmission and/or SL transmission while other UEs 20 in the group perform the SL reception. For example, representative UE 20 performs the UL transmission and/or SL transmission based on the received group-common DCI, and other UEs 20 may perform the SL reception based on the received group-common DCI. In this case, the UL transmission of other UEs 20 in the group may be individually indicated by the DCI for the UL scheduling different from the group-common DCI.

<Preliminary Setting of SL Reception>

For UEs 20 in the group to which the SL reception is indicated by the group-common DCI, a preliminary setting, for example, a reception setting of the reference signal transmitted from UE 20 performing the UL transmission and/or SL transmission may be made in order for UEs 20 to receive the signal transmitted from UE 20 performing the UL transmission and/or SL transmission. For example, UEs 20 in the group to which the SL reception is indicated by the group-common DCI (e.g., other UEs 20) may make a preliminary setting so as to receive the signal transmitted in SL from UE 20 performing the UL transmission and/or SL transmission (e.g., representative UE 20).

For example, prior to transmitting the group-common DCI for indicating the UL transmission and/or SL transmission as well as SL reception, base station 10 may indicate, by using another group-common DCI different from the group-common DCI, transmission of PRACH or Sounding Reference Signal (SRS) with respect to one of UEs 20 in the group (e.g., representative UE 20) and SL-reception of PRACH or SRS transmitted from the one of UEs 20 by other UEs 20 in the group.

In this case, base station 10 may indicate a PDCCH order or a SRS request to UEs 20 in the group by using the group-common RNTI. Each UE 20 in the group can recognize the indication of the PDCCH order or SRS request by using the group-common RNTI. As a result, other UEs 20 in the group can make the preliminary setting for the SL-reception of PRACH or SRS transmitted from, for example, representative UE 20.

Furthermore, base station 10 may set to UEs 20 via RRC signaling, a PRACH configuration or SRS configuration for CFRA of UEs 20 (or representative UE 20) in the group. RRC signaling allows each UE 20 in the group to recognize settings of the PRACH or SRS configuration for the corresponding CFRA. Thus, other UEs 20 in the group can receive, in SL, PRACH or SRS transmitted from, for example, representative UE 20. Incidentally, the term CFRA is an abbreviation for Contention Free RACH.

<UL Transmission in Other UEs>

Base station 10 may indicate, by using the group-common DCI or a DCI different from the group-common DCI (e.g., "UE-specific DCI"), the UL transmission to UEs 20 in the group, which have performed the SL reception in response to an indication by the group-common DCI. For example, base station 10 may indicate, to other UEs 20 in the group, the SL reception and UL transmission collectively by using the group-common DCI. Alternatively, base station 10 may indicate, to other UE 20 in the group, the SL reception by using the group-common DCI and indicate, to other UEs 20, the UL transmission by using the UE-specific DCI.

When indicating the UL transmission collectively to a plurality of UEs 20 by using the group-common DCI, base station 10 may indicate an MCS, SRI, TPMI, or the like for UEs 20 in the group-common DCI in association with the intra-group IDs of UEs 20, respectively. That is, in the group-common DCI, indication information such as the MCS, SRI, TPMI, or the like with respect to UE 20 may be associated with the intra-group ID of UE 20. Note that, the term SRI is abbreviation for Scheduling Request Indicator. The term TMPI is an abbreviation for Transmitted Precoding Matrix Indicator.

Alternatively, when indicating the UL transmission collectively to a plurality of UEs 20 by using the group-common DCI, base station 10 may indicate the MCS, SRI, TPMI, or the like with respect to each UE 20 by using a setting such as a Configured grant.

<Application Example of Group-Common DCI>

Figure 8:
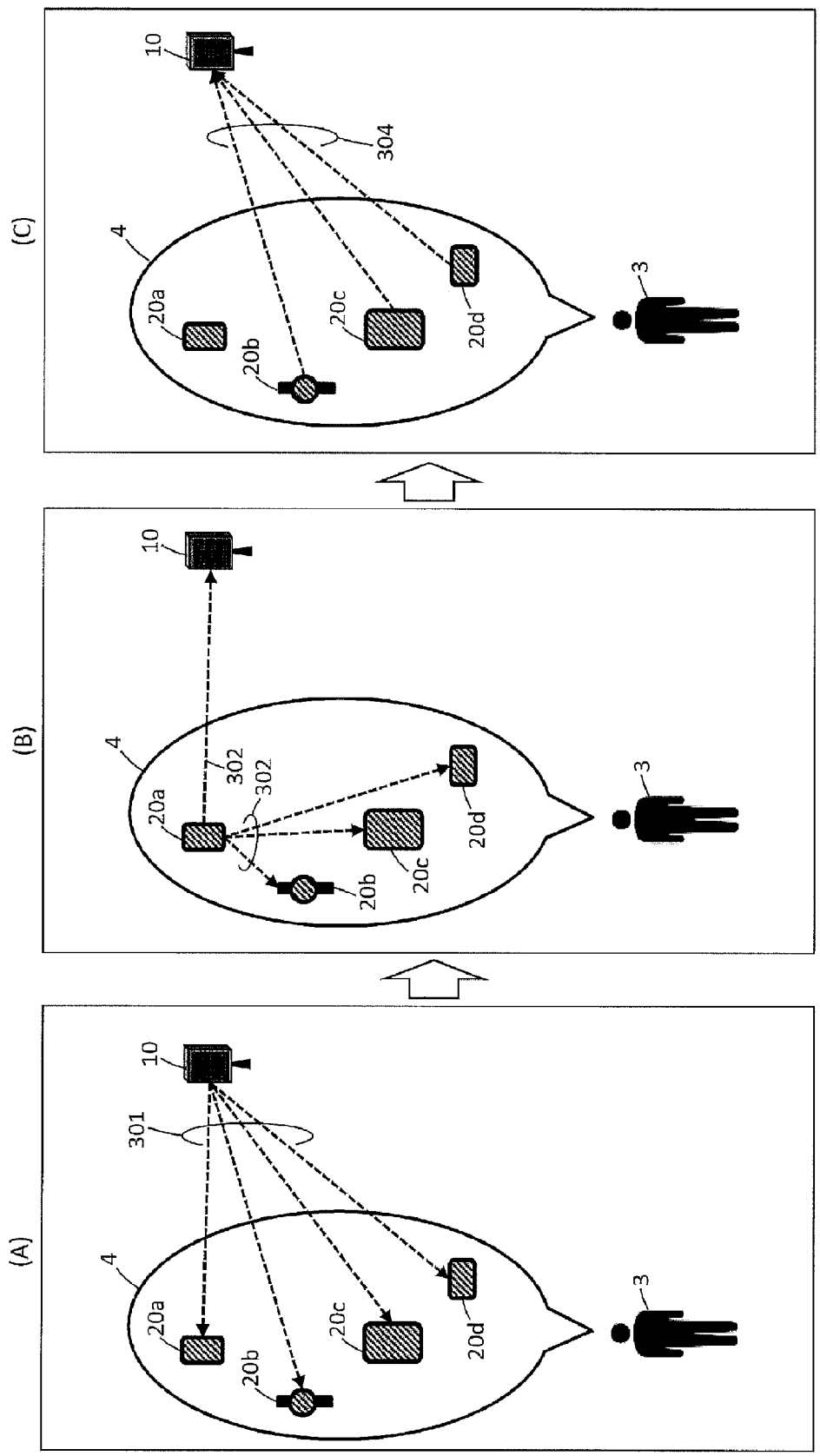
FIG. 8 illustrates an example in which a plurality of UEs belonging to a group according to the embodiment performs the radio communication.
Figure 9:
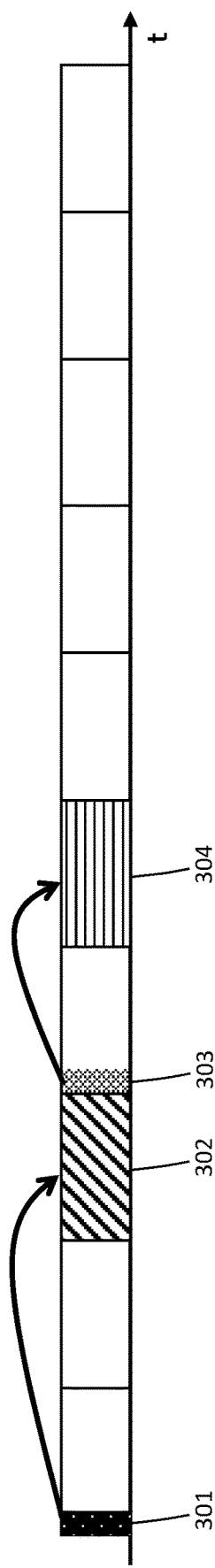
FIG. 9 illustrates an exemplary UL scheduling with respect to a plurality of UEs belonging to the group according to the embodiment.

FIG. 8 illustrates an example in which a plurality of UEs belonging to a group according to the embodiment performs the radio communication. FIG. 9 illustrates an exemplary UL scheduling with respect to a plurality of UEs belonging to the group according to the embodiment. With reference to FIGS. 8 and 9, a description will be given of an exemplary operation of a radio communication system using the above-described group-common DCI. Note that, in the following, a description will be given with an example in which representative UE is indicated by the group-common DCI, and the UL transmission is indicated by the UE-specific DCI with respect to other UEs in the group.

In FIG. 8, UEs 20a, 20b, 20c, and 20d belong to group 4. In group 4, UE 20a corresponds to the above-described representative UE, and UEs 20b, 20c, and 20d correspond to the above-described other UEs. Here, UEs 20a, 20b, 20c, and 20d in group 4 may operate as follows, respectively.

First, as illustrated in (A) of FIG. 8 and in FIG. 9, UEs 20a, 20b, 20c, and 20d receive group-common DCI 301 from base station 10. UEs 20a, 20b, 20c, and 20d recognize representative UE 20a in group 4 by the received group-common DCI 301.

Next, as illustrated in (B) of FIG. 8 and in FIG. 9, representative UE 20a in group 4 performs the UL transmission and SL transmission in time-resource 302 indicated by group-common DCI 301. On the other hand, other UEs 20b, 20c and 20d in group 4 receive, in SL, the signal transmitted in SL from representative UE 20a in time resource 302 indicated by group-common DCI 301. Note that, the UL transmission and SL transmission from representative UE 20a may be transmission by beamforming.

Next, as illustrated in FIG. 9, other UEs 20b, 20c, and 20d in group 4 receive DCI 303 for UE-specific UL scheduling from base station 10. As illustrated in (C) of FIG. 8 and in FIG. 9, other UEs 20b, 20c, and 20d then perform the UL transmission with respect to base station 10 in time-resource 304 indicated by DCI 303 for the UL scheduling.

In time resource 304, UL signals respectively from other UEs 20b, 20c, and 20d are spatially multiplexed. In this case, other UEs 20b, 20c, and 20d may be considered to simulatively perform transmission by using cooperative MIMO. The spatial multiplexing allows, for example, an UL signal from UE 20 of a user different from user 3 to be also multiplexed in time-resource 304. In addition, since a diversity effect obtained by the spatial multiplexing improves the received Signal-to-Interference plus Noise power Ratio (SINR) of base station 10, the higher-order (multi-valued) modulation scheme and/or broadband transmission can be applied to the UL signal. Thus, according to this configuration, it is possible to improve the UL throughput. Incidentally, in time resource 304, the UL signal from representative UE 20a may be spatially multiplexed with the UL signals from other UEs 20b, 20c, and 20d.

<C-Plane Control Via Representative UE>

C-plane control for a plurality of UEs 20 in the group may be performed via representative UE 20. For example, representative UE 20 may relay a Control (C)-plane signal via SL with respect to other UEs 20 in the group.

Figure 10:
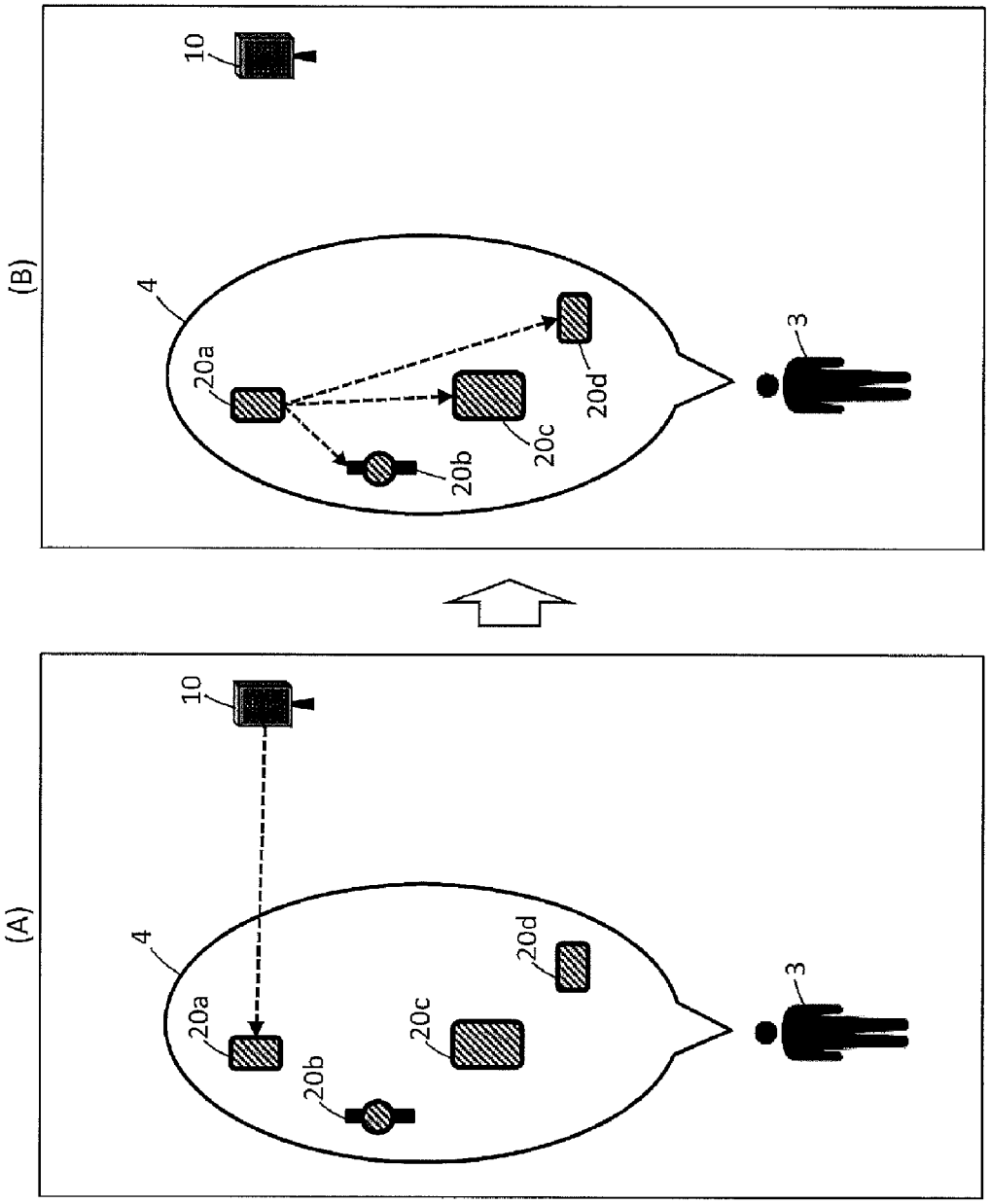
FIG. 10 illustrates an example in which a representative UE belonging to the group according to the embodiment relays a C-plane signal.

FIG. 10 illustrates an example in which representative UE 20 belonging to the group according to the embodiment relays the C-plane signal. With reference to FIG. 10, a description will be given of an exemplary operation of the radio communication system that executes the C-plane control of each UE 20 in the group via representative UE 20.

As illustrated in (A) of FIG. 10, representative UE 20a receives RRC signaling from base station 10. Next, as illustrated in (B) of FIG. 10, representative UE 20a transfers (that is, performs SL transmission) the received RRC signaling to other UEs 20b, 20c, and 20d in the group 4 via SL. That is, representative UE 20a relays RRC signaling for other UEs 20b, 20c, and 20d in group 4.

As illustrated in FIG. 10, by performing an RRC setting of other UEs 20b, 20c, and 20d in group 4 via representative UE 20a, overhead of RRC signaling can be offloaded to SL. Thus, compared to a case where base station 10 individually notifies UEs 20b, 20c, and 20d of RRC signaling, the overhead of RRC signaling of a linkage between base station 10 and UE 20 can be reduced. Moreover, representative UE 20a that relays RRC signaling can recognize the RRC settings of other UEs 20b, 20c, and 20d in group 4.

Besides, representative UE 20a may receive in SL, for example, a signal such as measurement information from other UEs 20b, 20c, and 20d in group 4 and may transmit in UL the information received in SL to base station 10 collectively.

SUMMARY OF THE PRESENT DISCLOSURE

UE 20 according to the present disclosure includes reception section 200A that receives the group-common DCI, which is one example of the control information related to the UL transmission common to the group, and control section 201 that controls at least one of the UL transmission to base station 10 and the SL reception from the UE (e.g., representative UE) performing the UL transmission, based on the group-common DCI. According to the configuration, one UE belonging to the group (e.g., representative UE) can perform the UL transmission in the time resource indicated by the group-common DCI, and the other UEs belonging to the group can perform the SL reception in the time resource indicated by the group-common DCI. In addition, a plurality of UEs 20 belonging to the group can spatially multiplex and transmit the UL signals in the time resource indicated by the group-common DCI or the UE-specific DCI. As a result, the time resource can be utilized more efficiently, and thus the UL throughput can be improved.

<Hardware Configuration and/or the Like>

Note that, the block diagrams used to describe the above embodiment illustrate blocks on a function-by-function basis. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or wirelessly), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmitting unit," or "transmitter." The methods for implementing the functions are not limited specifically as described above.

Figure 11:
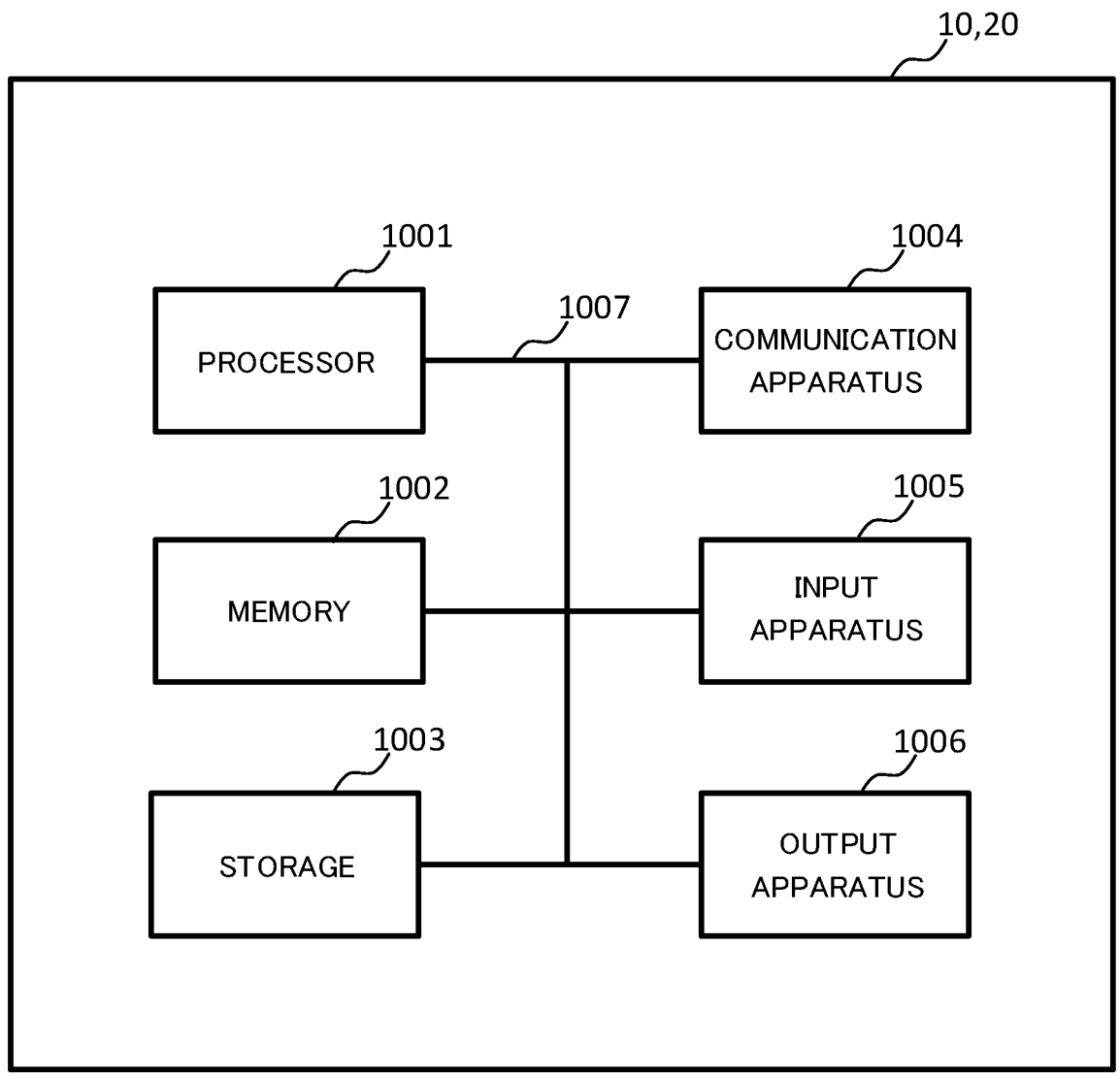
FIG. 11 illustrates an exemplary hardware configuration of the base station and the UE according to the embodiment.

For example, base station 10, user terminal (UE) 20, and the like according to an embodiment may function as a computer that executes processing of a radio communication method of the present disclosure. FIG. 11 illustrates an example of a hardware configuration of the base station and the user terminal according to one embodiment of the present disclosure. Base station 10 and user terminal 20 described above may be physically configured as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of base station 10 and user terminal 20 and may include one apparatus or a plurality of apparatuses illustrated in the drawings or may not include part of the apparatuses.

The functions of base station 10 and user terminal 20 are implemented by predetermined software (program) loaded into hardware, such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a Central Processing Unit (CPU) including an interface with peripheral apparatuses, a control apparatus, an arithmetic apparatus, a register, and the like. For example, scheduler 101, control section 201, higher layer processing sections 102 and 202, and the like as described above may be implemented by processor 1001.

Processor 1001 reads a program (a program code), a software module, data, and the like from at least one of storage 1003 and communication apparatus 1004 to memory 1002 and executes various types of processing according to the program (the program code), the software module, the data, and the like. As the program, a program for causing the computer to perform at least a part of the operations described in the above embodiment is used. For example, control section 201 of user terminal 20 may be implemented by a control program stored in memory 1002 and operated by processor 1001, and the other functional blocks may also be implemented in the same way. While it has been described that the various types of processing as described above are executed by one processor 1001, the various types of processing may be performed by two or more processors 1001 at the same time or in succession. Processor 1001 may be implemented using one or more chips. Note that, the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be referred to as a register, a cache, a main memory (a main storage apparatus), or the like. Memory 1002 can store a program (a program code), a software module, and the like that can be executed to carry out the radio communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (e.g., a compact disc, a digital versatile disc, or a Blu-ray (registered trademark) disc), a smart card, a flash memory (e.g., a card, a stick, or a key drive), a floppy (registered trademark) disk, and a magnetic strip. Storage 1003 may also be referred to as an auxiliary storage apparatus. The storage medium as described above may be, for example, a database, a server, or other appropriate media including at least one of memory 1002 and storage 1003.

Communication apparatus 1004 is hardware (a transmission and reception device) for communication between computers through at least one of wired and wireless networks and is also referred to as, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, antennae 108 and 208 described above may be realized by communication apparatus 1004. A transmission and reception section may be implemented as a transmission section and a reception section physically or logically separated from each other.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) that makes outputs to the outside. Note that, input apparatus 1005 and output apparatus 1006 may be integrated (for example, a touchscreen).

The apparatuses, such as processor 1001, memory 1002, and the like are connected by bus 1007 for communication of information. Bus 1007 may be configured using a single bus or using buses different between each pair of the apparatuses.

Furthermore, base station 10 and user terminal 20 may include hardware, such as a microprocessor, a Digital Signal Processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented using at least one of these pieces of hardware.

<Notification of Information, Signaling>

The notification of information is not limited to the aspects or embodiments described in the present disclosure, and the information may be notified by other methods. For example, the notification of information may be performed by one or a combination of physical layer signaling (for example, Downlink Control Information (DCI) and Uplink Control Information (UCI)), upper layer signaling (for example, Radio Resource Control (RRC) signaling, Medium Access Control (MAC) signaling, notification information (Master Information Block (MIB), and System Information Block (SIB))), and other signals. RRC signaling may be referred to as an RRC message and may be, for example, an RRC connection setup message, an RRC connection reconfiguration message, or the like.

<Applied System>

The aspects and embodiments described in the present specification may be applied to at least one of a system using Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

<Processing Procedure and the Like>

The orders of the processing procedures, the sequences, the flow charts, and the like of the aspects and embodiments described in the present disclosure may be changed as long as there is no contradiction. For example, elements of various steps are presented in exemplary orders in the methods described in the present disclosure, and the methods are not limited to the presented specific orders.

<Operation of Base Station>

Specific operations which are described in the present disclosure as being performed by the base station may sometimes be performed by an upper node depending on the situation. Various operations performed for communication with a terminal in a network constituted by one network node or a plurality of network nodes including a base station can be obviously performed by at least one of the base station and a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

<Direction of Input and Output>

The information or the like (see the item of "Information and Signals") can be output from a higher layer (or a lower layer) to a lower layer (or a higher layer). The information, the signals, and the like may be input and output through a plurality of network nodes.

<Handling of Input and Output Information and the Like>

The input and output information and the like may be stored in a specific place (for example, a memory) or may be managed using a management table. The input and output information and the like can be overwritten, updated, or additionally written. The output information and the like may be deleted. The input information and the like may be transmitted to another apparatus.

<Determination Method>

The determination may be made based on a value expressed by one bit (0 or 1), based on a Boolean value (true or false), or based on comparison with a numerical value (for example, comparison with a predetermined value).

<Variations and the Like of Aspects>

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Thus, the description of the present disclosure is intended for exemplary description and does not limit the present disclosure in any sense.

<Software>

Regardless of whether the software is referred to as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a website, a server, or other remote sources by using at least one of a wired technique (e.g., a coaxial cable, an optical fiber cable, a twisted pair, and a Digital Subscriber Line (DSL)) and a wireless technique (e.g., an infrared ray and a microwave), the at least one of the wired technique and the wireless technique is included in the definition of the transmission medium.

<Information and Signals>

The information, the signals, and the like described in the present disclosure may be expressed by using any of various different techniques. For example, data, instructions, commands, information, signals, bits, symbols, chips, and the like that may be mentioned throughout the entire description may be expressed by one or any combination of voltage, current, electromagnetic waves, magnetic fields, magnetic particles, optical fields, and photons.

Note that, the terms described in the present disclosure and the terms necessary to understand the present disclosure may be replaced with terms with the same or similar meanings. For example, at least one of the channel and the symbol may be a signal (signaling). The signal may be a message. The Component Carrier (CC) may be referred to as a carrier frequency, a cell, a frequency carrier, or the like.

<"System" and "Network">

The terms "system" and "network" used in the present disclosure can be interchangeably used.

<Names of Parameters and Channels>

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulae and the like using the parameters may be different from the ones explicitly disclosed in the present disclosure. Various channels (e.g., PUCCH and PDCCH) and information elements can be identified by any suitable names, and thus, various names assigned to these various channels and information elements are not limitative in any respect.

<Base Station>

The terms "Base Station (BS)," "radio base station," "fixed station," "NodeB," "eNodeB (eNB)," "gNodeB (gNB)," "access point," "transmission point," "reception point," "transmission/reception point," "cell," "sector," "cell group," "carrier," and "component carrier" may be used interchangeably in the present disclosure. The base station may be referred to as a macro cell, a small cell, a femtocell, a pico cell, or the like.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor Remote Radio Head (RRH)). The term "cell" or "sector" denotes part or all of the coverage area of at least one of the base station and the base station subsystem that perform the communication service in the coverage.

<Mobile Station>

The terms such as "Mobile Station (MS)," "user terminal," "User Equipment (UE)," and "terminal" may be used interchangeably in the present disclosure.

The mobile station may be referred to as, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

<Base Station/Mobile Station>

At least one of the base station and the mobile station may be referred to as a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or an unmanned-type robot). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the user terminal. For example, the aspects and the embodiments of the present disclosure may find application in a configuration that results from replacing communication between the base station and the user terminal with communication between a plurality of user terminals (such communication may be referred to as, e.g., device-to-device (D2D), vehicle-to-everything (V2X), or the like). In this case, user terminal 20 may be configured to have the functions that base station 10 described above has. The wordings such as "uplink" and "downlink" may be replaced with a corresponding wording for inter-equipment communication (e.g., "side"). For example, an uplink channel, a downlink channel, and the like may be replaced with a side channel. Similarly, the user terminal in the present disclosure may be replaced with the base station. In this case, base station 10 may be configured to have the functions that user terminal 20 described above has.

Meaning and Interpretation of Terms

As used in the present disclosure, the term "determining" may encompass a wide variety of actions. For example, "determining" may be regarded as judging, calculating, computing, processing, deriving, investigating, looking up, searching (or, search or inquiry)(e.g., looking up in a table, a database or another data structure), ascertaining and the like. Moreover, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming," "expecting," "considering," and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

<Reference Signal>

The reference signal may also be abbreviated as an RS and may also be referred to as a pilot depending on the applied standard.

<Meaning of "Based On">

The description "based on" used in the present disclosure does not mean "based only on," unless otherwise specified.

In other words, the description "based on" means both of "based only on" and "based at least on."

<Terms "First" and "Second">

Any reference to elements by using the terms "first," "second," and the like that are used in the present disclosure does not generally limit the quantities of or the order of these elements. The terms can be used as a convenient method of distinguishing between two or more elements in the present disclosure. Thus, reference to first and second elements does not mean that only two elements can be employed or that the first element has to precede the second element somehow.

<"Means">

The term "means" in the configuration of each apparatus described above may be replaced with such as "section," "circuit," or "device."

<Open-Ended Format>

In a case where terms "include," "including," and their modifications are used in the present disclosure, these terms are intended to be inclusive like the term "comprising." Furthermore, the term "or" used in the present disclosure is not intended to be an exclusive or.

<Time Units Such as a TTI, Frequency Units Such as an RB, and a Radio Frame Configuration>

The radio frame may be constituted by one frame or a plurality of frames in the time domain. The one frame or each of the plurality of frames may be referred to as a subframe in the time domain.

The subframe may be further constituted by one slot or a plurality of slots in the time domain. The subframe may be a fixed time length (e.g., 1 ms) independent of numerology.

The numerology may be a communication parameter that is applied to at least one of transmission and reception of a certain signal or channel. The numerology may indicate, for example, at least one of SubCarrier Spacing (SCS), a bandwidth, a symbol length, a cyclic prefix length, a Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one symbol or a plurality of symbols in the time domain. Moreover, the mini-slot may be referred to as a subslot. The mini-slot may be constituted by a smaller number of symbols than the slot. A PDSCH (or a PUSCH) which is transmitted in the time unit that is greater than the mini-slot may be referred to as a PDSCH (or a PUSCH) mapping type A. The PDSCH (or the PUSCH) which is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be referred to by other corresponding names.

For example, one subframe, a plurality of contiguous subframes, one slot, or one mini-slot may be referred to as a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms. Note that, a unit representing the TTI may be referred to as a slot, a mini-slot, or the like instead of a subframe.

Here, the TTI, for example, refers to a minimum time unit for scheduling in radio communication. For example, in an LTE system, the base station performs scheduling for assigning a radio resource (a frequency bandwidth, a transmit power, and the like that can be used in each user terminal) on a TTI-by-TTI basis to each user terminal. Note that, the definition of TTI is not limited to this.

The TTI may be a time unit for transmitting a channel-coded data packet (a transport block), a code block, a codeword, or the like or may be a unit for processing such as scheduling and link adaptation. Note that, when the TTI is assigned, a time section (e.g., the number of symbols) to which the transport block, the code block, the codeword, or the like is actually mapped may be shorter than the TTI.

Note that, in a case where one slot or one mini-slot is referred to as the TTI, one or more TTIs (i.e., one or more slots, or one or more mini-slots) may be a minimum time unit for scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that the long TTI (e.g., the usual TTI, the subframe, or the like) may be replaced with the TTI which has a time length that exceeds 1 ms, and the short TTI (e.g., the shortened TTI or the like) may be replaced with a TTI which has a TTI length that is less than a TTI length of the long TTI and is equal to or longer than 1 ms.

A Resource Block (RB) is a resource assignment unit in the time domain and the frequency domain, and may include one or more contiguous subcarriers in the frequency domain. The number of subcarriers which is included in the RB may be identical regardless of the numerology, and may be 12, for example. The number of subcarriers which is included in the RB may be determined based on the numerology.

Moreover, the RB may include one symbol or a plurality of symbols in the time domain and may have a length of one slot, one mini slot, one subframe, or one TTI. One TTI, one subframe, and the like may be constituted by one resource block or a plurality of resource blocks.

Note that, one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A Bandwidth Part (BWP) (which may be referred to as a partial bandwidth or the like) may represent a subset of contiguous common resource blocks (RBs) for certain numerology in a certain carrier. Here, the common RBs may be identified by RB indices that use a common reference point of the carrier as a reference. The PRB may be defined by a certain BWP and may be numbered within the BWP. The BWP may include a BWP for UL (UL BWP) and a BWP for DL (DL BWP). A UE may be configured with one or more BWPs within one carrier.

At least one of the configured BWPs may be active, and the UE does not have to assume transmission/reception of a predetermined signal or channel outside the active BWP. Note that, "cell," "carrier," and the like in the present disclosure may be replaced with "BWP."

Structures of the radio frame, the subframe, the slot, the mini-slot, the symbol, and the like are described merely as examples. For example, the configuration such as the number of subframes which is included in the radio frame, the number of slots per subframe or radio frame, the number of mini-slots which is included within the slot, the numbers of symbols and RBs which are included in the slot or the mini-slot, the number of subcarriers which is included in the RB, the number of symbols within the TTI, the symbol length, the Cyclic Prefix (CP) length, and the like can be changed in various ways.

<Maximum Transmit Power>

The "maximum transmit power" described in the present disclosure may mean a maximum value of the transmit power, the nominal UE maximum transmit power, or the rated UE maximum transmit power.

<Article>

In a case where articles, such as "a," "an," and "the" in English, for example, are added in the present disclosure by translation, nouns following these articles may have the same meaning as used in the plural.

<"Different">

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different."

INDUSTRIAL APPLICABILITY

One aspect of the present disclosure is useful for radio communication systems.

REFERENCE SIGNS LIST

10 Base Station
20 UE, User Terminal
100A, 200B Transmission section
100B, 200A Reception section
101 Scheduler
102, 202 Higher layer processing section
103, 203 Error control section
104, 204 Encoding and decoding section
105, 205 Modulation and demodulation section
106, 206 Resource mapping and demapping section
107, 207 Antenna mapping and demapping section
108, 208 Antenna
201 Control section

The invention claimed is:

1. A terminal, comprising:
a reception section that receives group-common Downlink Control Information (DCI) related to uplink transmission, the group-common DCI being common to a terminal group; and
a control section that controls, based on the group-common DCI, at least one of the uplink transmission and sidelink reception from another terminal performing the uplink transmission,
wherein the control section recognizes a representative of the terminal group based on the group-common DCI,
wherein if the terminal is the representative, the control section controls the uplink transmission and sidelink transmission to other terminals belonging to the terminal group based on the group-common DCI, and
wherein if the terminal is not the representative, the control section controls the sidelink reception from other representative terminals based on the group-common DCI and the uplink transmission based on specific DCI which is different from the group-common DCI.

2. The terminal according to claim 1, wherein the control section controls reception of the group-common DCI by using identification information common to the terminal group.

3. The terminal according to claim 1, wherein the reception section receives group-common DCI for another terminal belonging to the terminal group, and the control section controls transfer of the group-common DCI for the other terminal belonging to the terminal group to the other terminal.

4. A radio communication method, comprising:
receiving, by a terminal, group-common Downlink Control Information (DCI) related to uplink transmission, the group-common DCI being common to a terminal group; and
controlling, by the terminal, based on the group-common DCI, at least one of the uplink transmission and sidelink reception from another terminal performing the uplink transmission,
wherein recognizing, by a terminal, a representative of the terminal group based on the group-common DCI,
wherein if the terminal is the representative, controlling, by a terminal, the uplink transmission and sidelink transmission to other terminals belonging to the terminal group based on the group-common DCI, and
wherein if the terminal is not the representative, controlling, by a terminal, the sidelink reception from other representative terminals based on the group-common DCI and the uplink transmission based on specific DCI which is different from the group-common DCI.

* * * * *